United States Patent Office 3,495,798
Patented Feb. 17, 1970

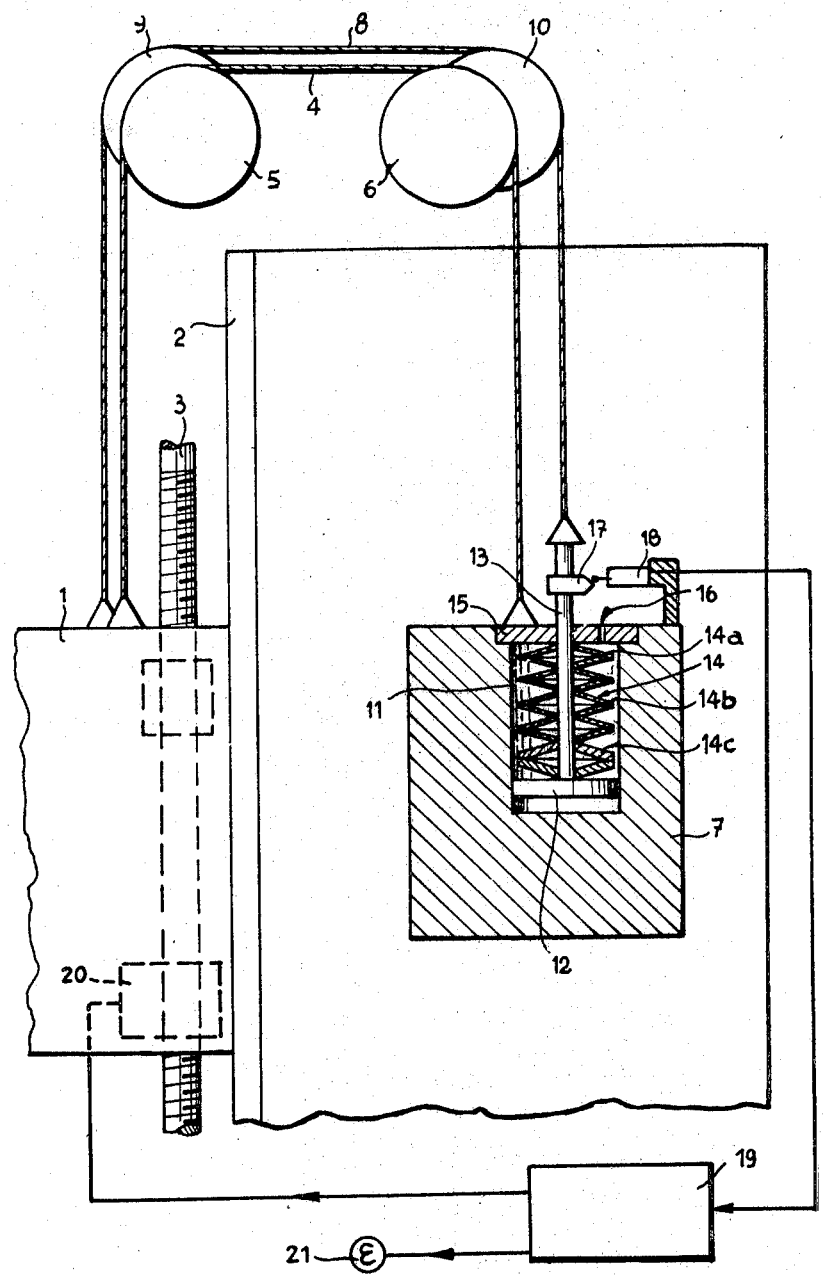

3,495,798
SAFETY DEVICE FOR HANGING COUNTERWEIGHT
Maso Galbarini, Pavia, and Francesco Cotta Ramusino, Milan, Italy, assignors to Innocenti Società Generale per l'Industria Metallurgica e Meccanica, Milan, Italy
Filed Mar. 4, 1968, Ser. No. 710,372
Claims priority, application Italy, Dec. 9, 1967, 54,050/67
Int. Cl. E05d *17/00;* A47h *11/02*
U.S. Cl. 248—364                                4 Claims

ABSTRACT OF THE DISCLOSURE

A safety device for suspending a counterweight, for example in a machine tool, in the event of failure of the main counterweight suspension comprises an auxiliary suspension member connected to the counterweight through shock-absorbing means which tension the auxiliary member gradually in accordance with a predetermined law to decelerate the counterweight gradually upon failure of said main suspension.

---

The invention relates to safety devices for hanging counterweights, for example, counterweights in machine tools.

As is well known, hanging counterweights are often provided in, for example, machine tools having vertically movable components, to reduce the power needed to effect the movement and to reduce stresses on the parts effecting the said movement. Counterweights are usually suspended by means of cables or chains travelling over pulleys.

A sudden failure of the counterweight suspension may result in falling of the counterweight, which may in turn lead to serious damage.

An object of the present invention is to provide a safety device which prevents falling of the counterweight in the event of failure of a conventional suspension therefor. Accordingly, the present invention provides a safety device for suspending a counterweight, for example, in a machine tool, in the event of failure of a main counterweight suspension, comprising an auxiliary flexible suspension member adapted to support the counterweight entirely in the event of failure of the main suspension, characterised in that said auxiliary suspension member is connected to the counterweight through the intermediary of shock-absorbing means adapted to damp relative movement of the counterweight and the auxiliary suspension member while transmitting tensile stress gradually to the auxiliary member in accordance with a predetermined law to decelerate the counterweight gradually upon failure of the main suspension.

The safety device according to the invention is of simple, sturdy and inexpensive construction, and is capable of safely carrying the counterweight in the event of failure of the main conventional suspension, and of signalling such failure. Means may be provided for stopping automatically the translational movement of the movable component with which the counterweight is connected in the event of such failure being signalled.

The invention will be more clearly understood from the following description, given by way of example only, with reference to the accompanying drawing, which is a diagrammatic part-sectional side elevation of a safety device for the suspension of a counterweight according to one embodiment of the invention.

A movable component 1 of a machine tool moves vertically along guides carried by a fixed part 2 of the machine tool, the movement being effected by means of a rotary leadscrew 3 in a conventional manner.

The movable component 1 is connected by a flexible main suspension member 4 in the form of a cable or chain to a hanging counterweight 7, the suspension member 4 passing over grooved pulleys 5, 6.

The safety device according to the invention includes an auxiliary flexible suspension member 8 passing over pulleys 9, 10 similar to the pulleys 5, 6. The auxiliary suspension member 8 is adapted to connect the counterweight 7 to the movable component 1 and to support the entire weight of the counterweight 7 in the event of failure of the main suspension member 4

The auxiliary flexible suspension member 8 is rigidly secured to the movable component 1 and is connected to the counterweight 7 through the intermediary of shock-absorbing means adapted to load the suspension member 8 gradually according to a predetermined law to effect gradual deceleration of the counterweight 7 in the event of failure of the main suspension member 4.

For this purpose the counterweight 7 is provided with a cylinder 11 having a vertical axis. The cylinder 11 may be formed within the counterweight 7 as shown, or in a part securely fixed to the counterweight 7. A piston 12 is movable within the cylinder 11 and is carried by a piston rod 13 which extends axially within the cylinder 11 and which is secured at its upper end to the auxiliary suspension member 8.

The cylinder 11 is closed at its upper end by an upper end wall 15. The piston 12 and end wall 15 constitute respective abutments between which a plurality of stacked resilient elements 14, disposed within the cylinder 11, may be compressed. In the embodiment shown the resilient elements 14 comprise spring washers of the so-called Belleville type, but any convenient type of resilient element may be used.

The resilient elements 14 are subdivided into groups having different stiffness. Thus the uppermost elements 14a are of relatively low stiffness such as to maintain a given minimum tension in the auxiliary suspension member 8. The elements 14a are pre-stressed on assembly of the device in accordance with the length of the member 8. An intermediate set of elements 14b, is of greater stiffness and a third, lowermost, set of elements 14c, is of still greater stiffness.

The cylinder 11 is filled with a high viscosity damping fluid, for example, grease, which may be expelled from the cylinder 11 by the piston 12, through a calibrated orifice 16 formed in the upper end wall 15, upon relative movement of the piston 12 against the resilient elements 14.

In the event of sudden failure of the main suspension member 4, the auxiliary suspension member 8 gradually takes up the weight of the counterweight 7, the resilient elements 14a, 14b, 14c of successively increasing stiffness being progressively compressed. Thus tensile stress is transmitted gradually to the member 8 without the occurrence of a sudden tensile overload, the descending counterweight 7 being gradually decelerated.

The progressive character of the loading of the suspension member 8 is ensured by the controlled outlet of the damping fluid through the orifice 16, the piston 12 exerting a constant pressure on the fluid, which therefore issues at a constant rate through the orifice 16. The rate of stressing of the resilient elements 14 therefore depends upon the viscosity of the damping fluid and the cross-section of the orifice 16, and by suitably selecting these parameters the stressing may be arranged to take place according to a predetermined law.

By the combined action of the damping fluid, which limits the speed of the piston 12, and resilient elements 14, the counterweight 7 is therefore gradually slowed down upon failure of the main suspension member 4, and breakage of the auxiliary suspension member 8 due to a sudden stress is avoided.

The safety device is moreover provided with means for indicating failure of the main suspension member 4 and for arresting movement of the movable member 1 automatically upon the occurrence of such failure. For this purpose the piston rod 13 carries a switch actuating cam 17 which, as the counterweight 7 moves downwards on failure of the main member 4, actuates a microswitch 18 carried by said counter weight and controlling an electrical circuit 19 (indicated diagrammatically) which controls the operation of means 20 for stopping the movable component 1 and which provides an indication of the failure in any convenient manner, for example, by illuminating a lamp 21.

Failure of the main suspension member 4 for the counterweight 7 therefore results automatically in immediate arrest of the movement of the counterweighted component 1.

It will be understood that the invention is of general applicability and is not confined in its application to machine tools.

We claim:

1. In a counterweight suspension system comprising a counterweight and main suspension means supporting the counterweight, an improved safety device comprising: an auxiliary flexible suspension member and shock absorbing means interconnecting the auxiliary suspension member and the counterweight, said shock absorbing means including a plurality of resilient elements of different stiffness compressed in a cylindrical bore in the counterweight, the bore having a vertical axis and containing a damping fluid, a piston movable within said cylindrical bore and attached to the auxiliary suspension member, the resilient elements being compressed between the piston and an upper wall of the cylinder.

2. Safety device as claimed in claim 1 wherein the piston is a fluid-tight sliding fit in the cylinder and the said upper end wall is provided with aperture means through which damping fluid is expelled upon failure of the main suspension means.

3. Safety device as claimed in claim 1 wherein the piston has a piston rod passing sealingly through said upper end wall, a switch actuating member is provided on said piston rod outside the cylinder, a switch device is disposed externally of the cylinder to be actuated by the switch actuating member upon failure of the main suspension means, and indicating means for indicating said failure are connected to said switch device.

4. Safety device as claimed in claim 3 including means effective to stop movement of a counterweighted component, said means being operatively controlled by said switch device to be effective upon failure of the main suspension means.

References Cited

UNITED STATES PATENTS 2,587,016   2/1952   Watts _____ 267—1 X

FOREIGN PATENTS 16,905   of 1909   Great Britain.
333,609   12/1958   Switzerland.

CHANCELLOR E. HARRIS, Primary Examiner

U.S. Cl. X.R.

248—331